July 23, 1946.  L. C. BARNES ET AL  2,404,562
RECORDING SCALE
Filed Jan. 6, 1938   6 Sheets-Sheet 1
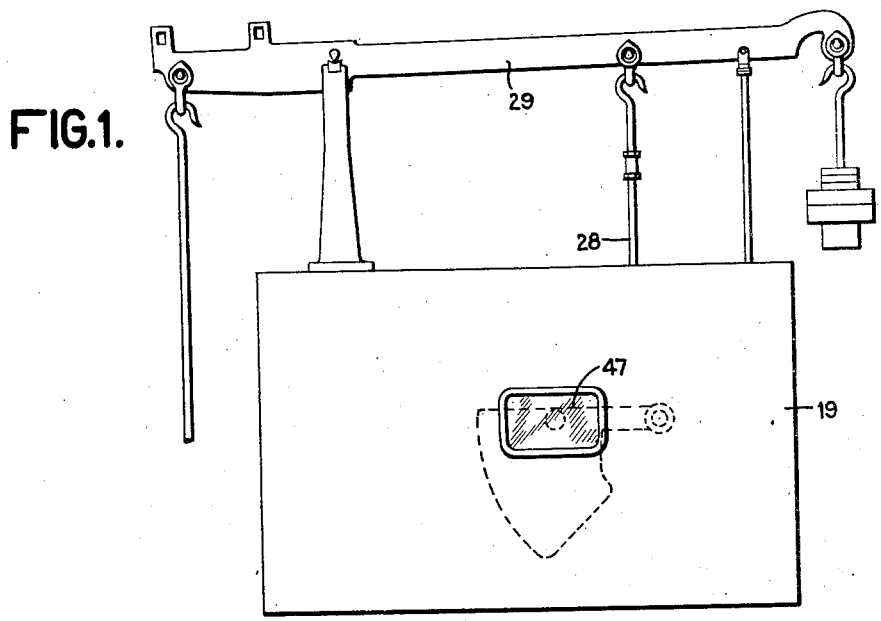
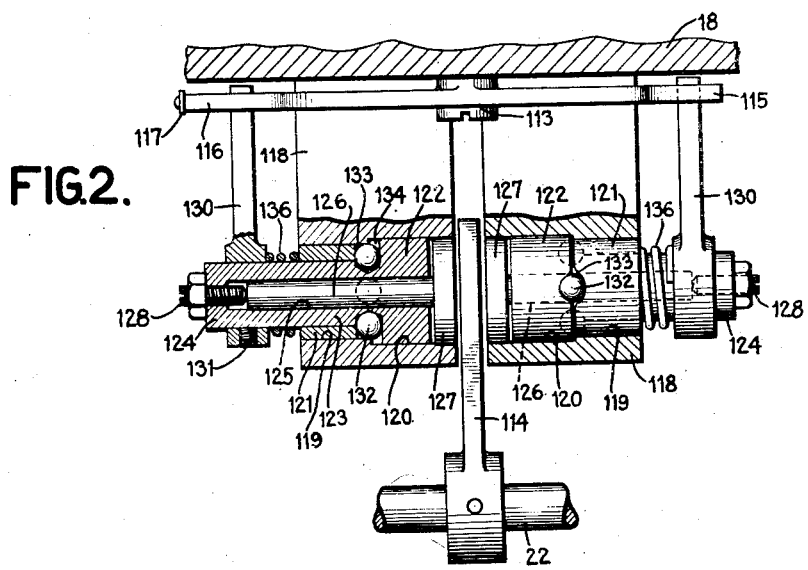
INVENTORS
LEWIS C. BARNES
RAYMOND B. HOLT
BY
ATTORNEYS

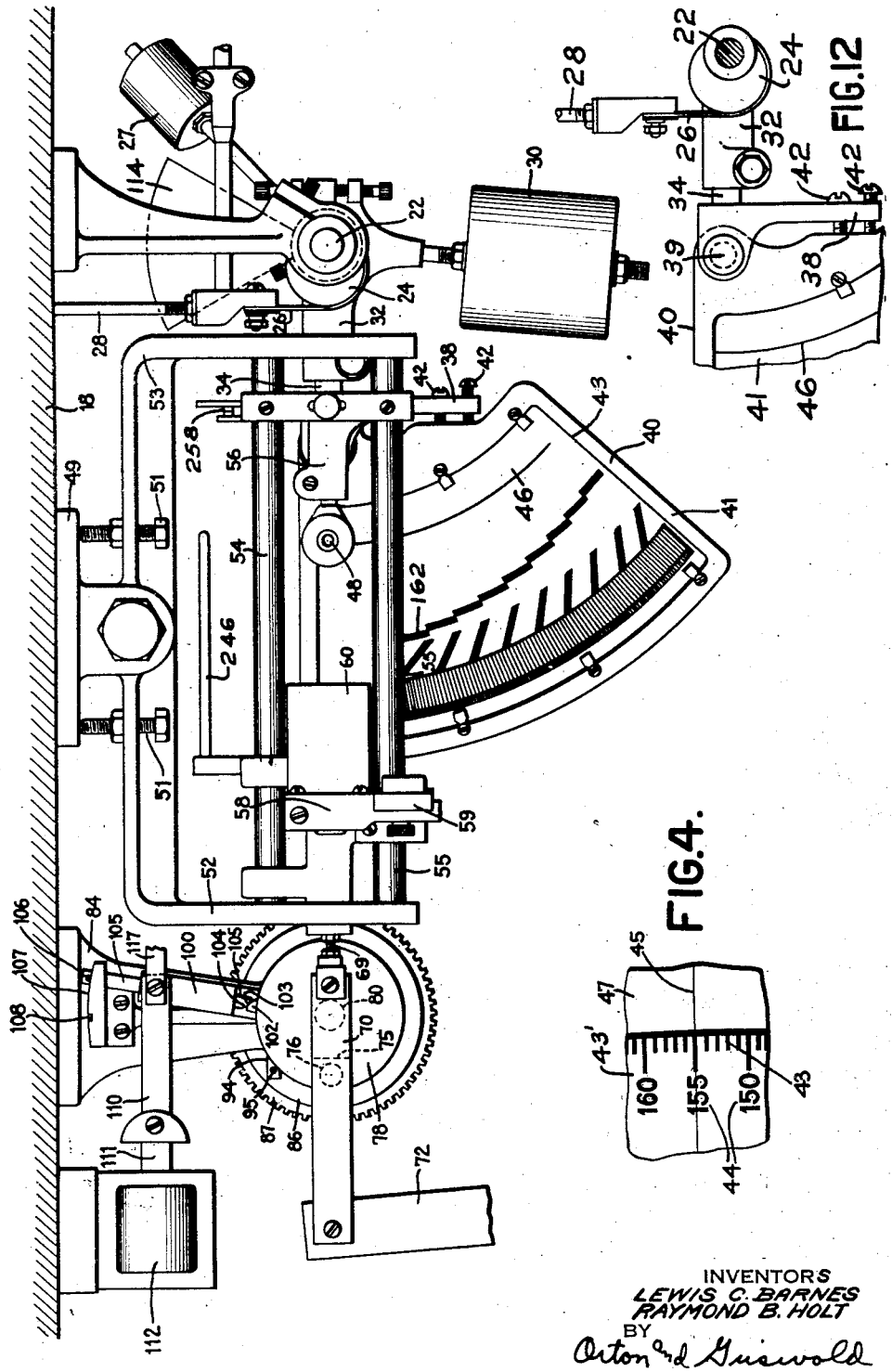

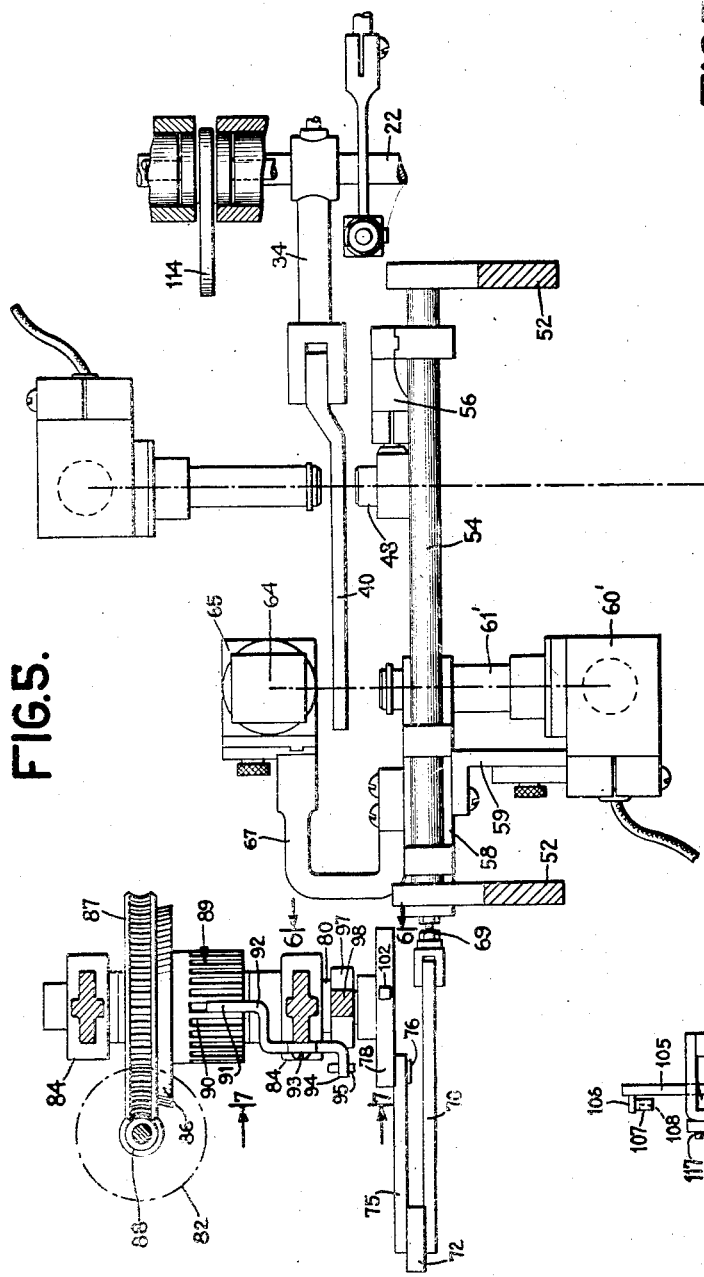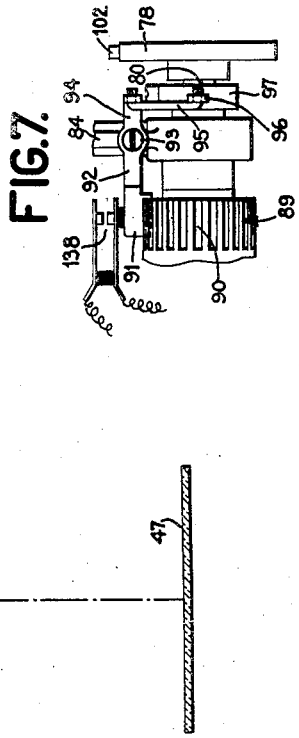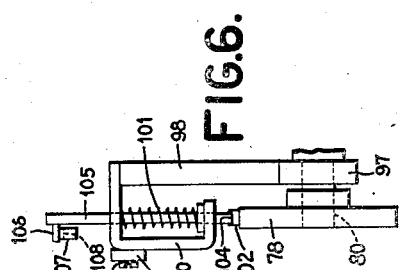

July 23, 1946.   L. C. BARNES ET AL   2,404,562
RECORDING SCALE
Filed Jan. 6, 1938   6 Sheets-Sheet 4

July 23, 1946.　　L. C. BARNES ET AL　　2,404,562
RECORDING SCALE
Filed Jan. 6, 1938　　6 Sheets-Sheet 5
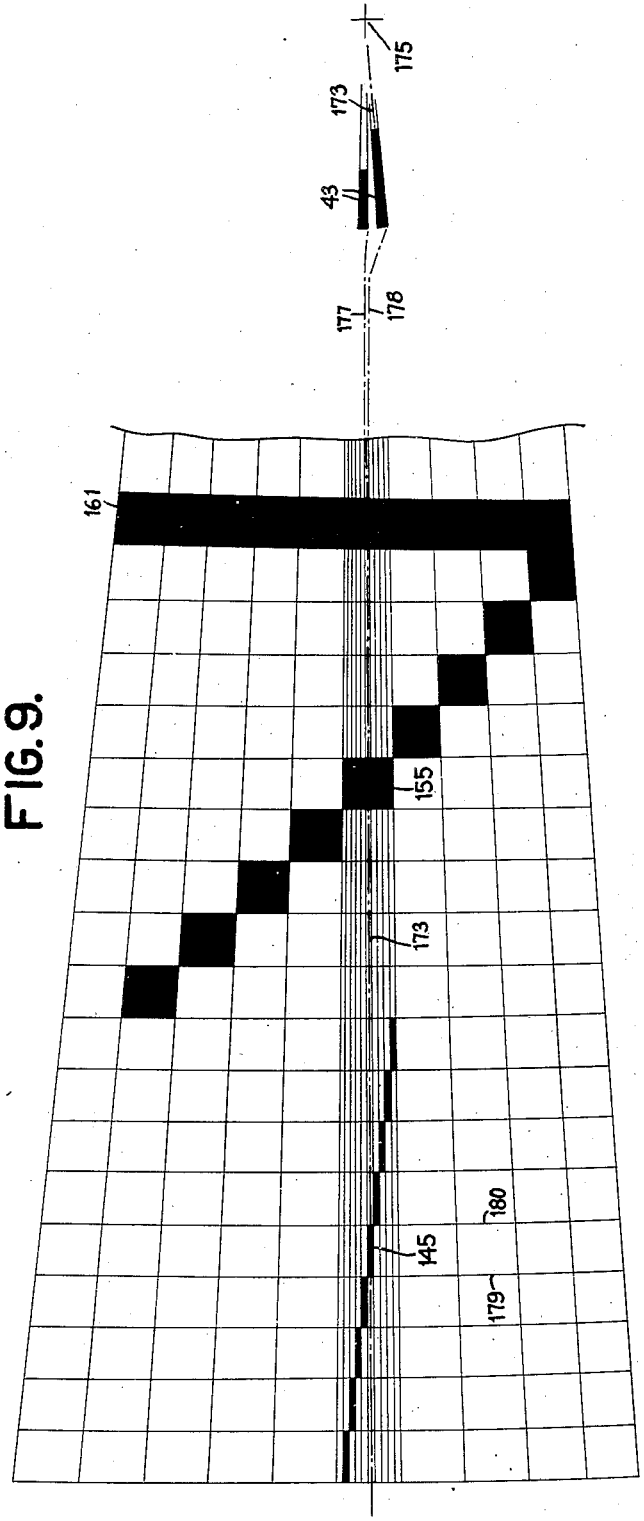
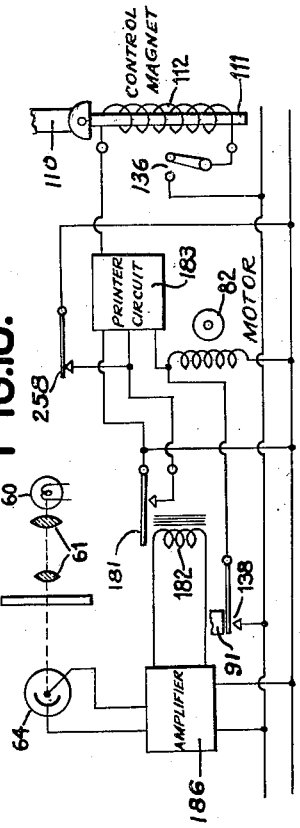
INVENTORS
LEWIS C. BARNES
RAYMOND B. HOLT
BY
ATTORNEYS July 23, 1946.  L. C. BARNES ET AL  2,404,562
RECORDING SCALE
Filed Jan. 6, 1938  6 Sheets-Sheet 6

INVENTORS
LEWIS C. BARNES
RAYMOND B. HOLT
BY
Arton 2nd Griswold
ATTORNEYS

Patented July 23, 1946

2,404,562

UNITED STATES PATENT OFFICE 2,404,562

RECORDING SCALE

Lewis C. Barnes, Rutland, Vt., and Raymond B. Holt, Los Angeles, Calif., assignors to The Howe Scale Company, Rutland, Vt., a corporation of Vermont Application January 6, 1938, Serial No. 183,630

7 Claims. (Cl. 234—5.4)

This invention relates to weighing scales of the kind in which a member movable in proportion to the displacement of the scale beam is utilized to perform work, such as the printing of an indication of the weight of the load on the scale.

One object of the present invention is a scale in which is utilized the passage of light through substantially light transmitting areas arranged in predetermined relation corresponding to loads on the scale on a member movable proportionately to the scale beam to initiate or effect movement of a member performing work.

Another object of the invention is a scale in which the movement of a light responsive device, which movement is wholly independent of the scale mechanism, actuates instrumentalities to perform work, such as printing mechanism.

A further object of the invention is to provide electrically controlled and/or actuated instrumentalities to effect movement of the light responsive device and/or instrumentalities performing work.

The invention also has to do with restraining instrumentalities for the weighing mechanism whereby movement is prevented while the chart is being scanned by the light responsive element.

The invention also seeks a weighing scale of the character described which is practical from the standpoint of manufacture and use.

These and other objects of the invention and the means for their attainment will be more apparent from the following detailed description taken in connection with the accompanying drawings illustrating one embodiment by which the invention may be realized, and in which:

Figure 1 is a view in front elevation showing a weighing scale to which the invention is applied;

Figure 2 is a fragmentary view, partly in section, showing details of braking devices for the scale mechanism;

Figure 3 is a view in front elevation, showing the chart scanning mechanism and associated parts in the position they assume when no load is on the scale;

Figure 4 is a fragmentary view showing the weight indication as projected on the screen;

Figure 5 is a plan view of structure shown in Figure 3;

Figure 6 is a transverse sectional view of details of construction taken in the plane indicated by the line 6—6 of Figure 5 and looking in the direction of the arrows;

Figure 7 is a fragmentary view in side elevation taken in the plane indicated by the line 7—7 of Figure 5 and looking in the direction of the arrows;

Figure 9 is a schematic view on an enlarged scale showing the manner of laying out the chart of this invention;

Figure 10 is a wiring diagram;

Figure 12 is a fragmentary view showing the adjustable mounting for the chart.

Figure 8:
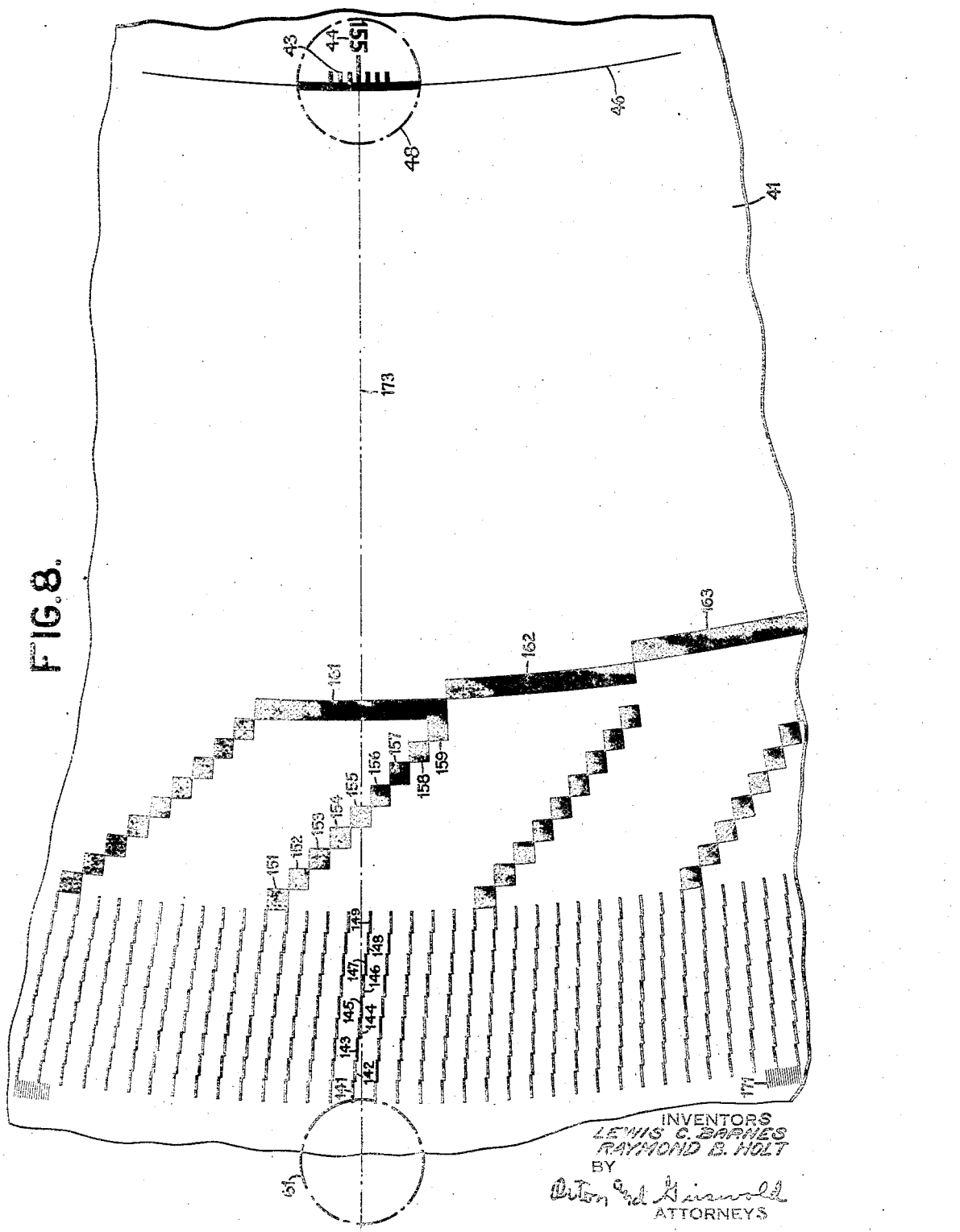
Figure 8 is an enlarged view of the weight indicating chart.

Referring first to Figures 1 and 3, the shaft 22 carries a cam 24, connected by a flexible tape 26 to the steel yard rod 28 of the scale whereby, for each motion of the beam 29, a corresponding proportional motion of the cam 24, and consequently of the shaft 22, is had. The shaft 22 carries a counterweight 27 and a pendulum 30. Extending in a generally horizontal direction (as viewed) from the shaft 22, is an arm 32. On the arm 32 is adjustably mounted the end 34 of an adjusting bracket having a downwardly extending arm portion 38. A frame member 40, carrying a chart 41 is pivoted to the arm 34, as at 39 (Figure 12), and is adjustable with respect to that arm, as by the set screws 42 in the arm 38 bearing against the chart frame 40 whereby the indicia 44 depicted on the chart may be adjusted to proper position so that the scale 46 thereon is, at all points, on exactly the same radius from the axis of the shaft 22. That is, so that all graduations 43 of the scale 46 are at exactly the same distance from the center of the shaft 22. It will thus be seen that as the shaft 22 is rocked in a clockwise direction when a load is on the scale, that the chart 41 swings upwardly in a clockwise direction bringing the graduations 43 and numerical indications 44 thereof on the scale 46 past a fixed lens 48 which projects the reading on a viewing screen 47. The numerals on chart 41 are transparent and conveniently inverted so that a simple lens system may be used to project graduations 43 and numerical indications 44 in non-inverted position on screen 47 as shown in Figures 1 and 4. A chart and scale is shown, described and claimed in Patent No. 1,357,731. Depending from the supporting surface or frame member 18, which may be the top of a casing 19, is a bracket 49 on which is pivoted, a frame having two depending parallel arms 52, 53 between which extends a pair of spaced horizontal guide rods 54 and 55. By means of the set screws 51, the frame 52, 53 is adjusted so that the various mechanisms carried by the guideways or rods 54, 55 may be moved or be positioned in a true horizontal plane, relatively speaking, to coincide with horizontal indicia (lines, etc.) on the chart 41. As shown, the projecting lens 48 is adjustably mounted, as by a frame member 56, on these rods 54 and 55.

Referring now also to Figure 3, a traveller or carriage 58 is slidably supported on the rods 54 and 55. A forwardly extending bracket 59 thereon adjustably carries a housing 60' containing (Figure 5) a source of light 60 and an optical lens system 61 within the tubular housing thereof adapted to project a beam of light on the chart 41 carried in the frame 40 and through a registering light transmitting portion thereof upon a light responsive circuit closing device, such as a photo-electric cell 64, referred to herein as a light responsive switch means and which is contained within the housing, indicated generally at 65 and adjustably carried on a bracket 67 extending rearwardly from and also mounted on the carriage 58. The cross-sectional shape of this beam of light corresponds to the cross-sectional shape of the smallest aperture or light transmitting portion of the chart 41, as will hereinafter be described.

The carriage is adjustably and pivotally connected, as at 69, to a link or connecting rod 70 connected to the upper end of a vertically extending work performing member shown as lever arm 72 pivoted on the frame of the machine, the lever 72 moving about its pivot in the plane of movement of the carriage 58. Lever 72 may be utilized to actuate any suitable form of printing mechanism to print a permanent record of the weight of the load on the scale, as will be understood. One such printing mechanism is shown, described and claimed in the copending application Serial Number 188,251 filed February 2, 1938.

The carriage 58 being motor propelled and being without mechanical connection with the delicate scale mechanism, may be utilized to perform the work of operating other mechanisms.

The upper end of lever 72 is also connected, as by a pivoted link 75, to a crank disk 78, as at 76, the crank disk 78 being fixed on a rotatable drive shaft 80 adapted to be clutched to and declutched from the motor 82 (Figure 5). The shaft is suitably supported, as from the frame member 18, by downwardly depending brackets 84 and is clutched, as by a friction disc 86, to the worm wheel 87 driven from a worm 88 on the shaft of motor 82. Keyed to the shaft 80 and in fact a part of the friction disc 86, is a locking device comprising a collar 89 provided on its periphery with a plurality of axially extending slots 90 adapted to be selectively engaged by a restraining means illustrated as a knife-like end 91 of a locking lever 91, 92, 94 which is pivoted as at 93 on the frame member or bracket 84. The forward end 94 of the locking lever 91, 92, 94 is connected, as by a link 95, with an outwardly extending arm 96 carried on a collar 97 freely rotatable on the shaft 80. This collar 97 also has a carrier frame member comprising an upwardly extending arm 99 which carries a downwardly extending portion 100 disposed to one side of the vertical plane of the crank disk 78. On the crank disk 78 is a lug 102 having a cam surface 103 adapted to be engaged by a corresponding cam surface 104 on the end of plunger rod 105 supported for reciprocation in the carrier frame member 99, 100 and normally urged downwardly by a spring 101. The upper end of the rod carries a tooth 106 adapted to ride over a curvilinear surface 107, Figure 3, and, at a certain point in its movement, enter a slot 108. The carrier frame member 100 is connected, as by a link 110, with the armature 111 of an electromagnet 112.

When the scale beam comes to rest, it is desirable to hold the chart 41 against movement so that the correct indication of the weight may be obtained. To this end, a chart brake 114—127 is provided, Figures 2 and 5. Fixed on the shaft 22 is a chart brake sector or vane 114 conveniently taking the form of a segment of a circle and of a size sufficient to be engaged at any position of the chart frame 40 at either of its extreme positions of movement. When the scale beam comes to rest, this brake vane 114 is adapted to be engaged and held against movement, thereby holding the shaft 22 against movement, and with it, of course, the chart 41. As shown in Figure 2, a lever 115 is pivoted intermediate its ends, as at 113, conveniently to the frame or casing member 18 so as to move in a horizontal plane and is connected at one end 116, as by a flexible link 117, with the link 110 or some associated part of the structure which is moved by the electromagnet 112. On each side of the brake surface 114 are brackets 118 which conveniently depend from and are rigidly secured to the frame member 18. Each bracket 118 is provided with a transverse bore 119, 120, the bore portion 120 being of greater diameter than bore portion 119. In bore portion 119 is a fixed sleeve 121. In bore portion 120 is the cylindrical head 122 of a turnable sleeve 123, the end 124 of which extends outwardly of the bearing 120. The cylindrical head 122, and the turnable sleeve 123 are formed with a continuous bore 125 within which is disposed the rod like shank 126 of the disk-like chart brake shoe 127 which is freely rotatable and adjustably positioned, as by the set screws 128 seated in the end portion 124 of the turnable sleeve 123. The brake shoes 127 are adapted to engage the chart brake vane 114 when the tubular turnable rods 124 are rotated in opposite directions. These turnable sleeves rotate freely in the bearings 132 and are so constructed that the disk-like brake shoes 127 are clearly out of contact with the brake surface 114 in inoperative position so as not to offer any impedance to the free movement of the shaft 22 and chart 41. The turnable sleeves 123 are rotated in opposite directions from the rotatable lever 115 by arms 130 to which the respective turnable sleeves 123 are fixedly connected, as by set screws 131, in adjusted position, and which arms 130 are also pivotally connected, at their other ends, to the lever 115. The sleeves 124 are advanced to bring the brake shoes 127 into contact with brake sector 114 by cam devices, shown in this instance as spherical members 132 disposed within companion recesses one of which, say 133, is formed in the fixed sleeve 121 and the companion recess 134 in the turnable head 122. A spring 136 normally tends to draw head 122 toward fixed sleeve 121 so that the balls 132 lie in the receptacle formed by the cooperating recesses 133, 134.

When a load is on the scale and the scale beam comes to rest, the operator closes the motor switch 136' (Figure 10) completing the circuit through the electromagnet 112 and thereby drawing the armature 111 inwardly or to the left, as viewed in Figure 3. This movement of the armature draws the link 117 thereby swinging the lever 115 about its pivot to turn the arms 130 and the sleeves 124 and cause the heads 122 to turn. As the heads 122 turn, the balls 132 being held in the recesses 133, the recesses 134 are moved past the balls until portions on one side of the recesses ride up on the ball thereby causing the heads 122 to be moved toward the brake vane sector 114 and causes them to bring the brake shoes 127 in frictional engagement with the brake vane 114, thereby holding the shaft 22 and the chart carried thereby in the position to which it has been moved by the movement of the scale beam. Any instrumentality for retaining the chart in the position assumed by it when the scale is balanced by the load may be availed of, so long as the braking instrumentalities assume their chart-retaining position without moving the chart from its exact weight indicating position.

Movement of the armature 111 also draws the link 110 to the left, as viewed, until the detent 106 enters the locking recess 108 in the curvilinear surface 107, the detent 106 entering the recess under the influence of the coil spring acting on the rod 105 in a downward direction. At this time, the cam surface 104 of the rod 105 is free of the lug 102 on the crank disk 78 so that the rod 105 is permitted to move downwardly to permit the latching movement of the detent into the recess 108. At this time also the shaft 80 is locked into position by the end 91 of locking lever 92 engaging a slot 90 in the toothed collar 89.

Movement of the arm 100 and plunger rod 105 in a counter-clockwise direction, as viewed in Figure 3, brings with it the collar 97, to which it is attached, and this movement of the collar 97 depresses the end 94 of locking lever 92, thereby releasing the locking device 90, 91. The toothed collar being now released, the shaft 80 and its associated clutch mechanism is free to move when driven by the motor 82. The end 91 of the locking lever 92, when raised, also serves as a switch actuating member closing a switch 138 (Figure 7) which energizes the motor 82 from the main supply line. The motor drives the shaft 80 in a clockwise direction, as viewed in Figure 3, through the worm 88 and worm wheel 87 and friction disc 86 thereby rotating the crank disk 78 also in a clockwise direction, and, through link 75 moving the lever 72 to the right, as viewed, and also through the link 70, commencing the traverse of the carriage 58 along the rods 54—55, and across the weight indicating chart 41 which has successive areas differing from other adjacent areas in their degree of opacity and is illustrated as a sector-shaped opaque member having light transmitting areas and whereof the axis formed by the intersection of all radial elements is the axis of rotation of the frame 40.

Conveniently, along one side, is an arcuate scale which is represented by the line 46. A fragmentary portion of this scale is shown magnified in Figure 8, to show the subdivisions or graduations 43 which represent units of weight and with which are associated the numerical indications 44 of the weight represented by the respective graduations. Near the left hand periphery of the chart, as viewed, are a plurality of series of light transmitting areas representing, for instance, units of weight. One such series of units is indicated on the chart as 141, 142, 143, 144, 145, 146, 147, 148 and 149. Each unit light transmitting area represents a unit of weight, for instance, pounds, and corresponds to a graduation 43 on the scale. It is of a width in a circumferential direction, defined by radial lines defining a unit subdivision on the scale. It will be noted that each light transmitting area, say 145, is displaced or in echelon with respect to the adjacent subdivision, say 146, and is defined by the radial lines defining the adjacent unit subdivision on the scale. Thus, there are nine such light transmitting areas 148, 149, etc. corresponding to the nine subdivisions of the scale say from zero to ten or from fifty to sixty, a light ray passing through such subdivision, say 145, represents the numeral 5 in the weight 155 pounds in the illustrated example. Obviously, there is one of these series 141-149 for each of the "tens," that is, one series between one and ten, a second series between ten and twenty and so on. There are also a plurality of series of light transmitting areas 151, 152, 153, 154, 155, 156, 157, 158 and 159 representing the numerals in the second or tens column. In the illustrated embodiment that numeral is 5. The second light transmitting area 152 represents the numeral 2 in the second column of the weight and so on, as before, for nine successive light transmitting areas. The next elongated light transmitting area 161 represents the first numeral in the third column of the weight, as before, and the adjacent light transmitting area 162 represents the numeral 2 etc. There would, of course, be nine successive areas 161-9 to represent the hundreds from 100 to 900 in the third column representing the weight. It will be noted that another series of light transmitting areas may be shown on the chart and represent the numeral 1 in the next adjacent or fourth column, i. e., the thousands column, and so on depending upon the capacity of the scale. On the extreme left, is a row of graduations 171 representing, on the chart of Figure 8, one-half pound graduations. These are represented in the same way and cover an area representing one-half of a successive unit light transmitting area, i. e., there would be two light transmitting areas 171 for each unit light transmitting area 141, etc. To recapitulate, a broken line 173 has been drawn radially through the one hundred fifty-five pound graduation of the scale. It passes through areas 161 (one hundred), 155 (fifty) and 145 (five) giving the reading one hundred and fifty-five pounds.

Referring to Figure 9, the light transmitting areas of the chart are laid out in the following manner: First the subdivisions 43 are laid out, on an extended scale, on the arc of a circle, the center of which is represented at 175 in Figure 9. The subdivisions 43 have, obviously, a predetermined width, and the actual arcuate distance between corresponding edges of successive graduations will be represented by the unit of weight and be defined anywhere on the chart by the radial lines coinciding with these edges. For example, this may be the area between the radial lines 177 and 178. At suitable radial distances from the center 175, arcs, such as 179 and 180, are drawn to define areas of suitable radial length, nine for each series so that the light transmitting areas are arranged in staggered formation or echelon and are separated and distinct from one another whereby the light ray travelling along the path 173 will only intercept those areas corresponding to the figures representing the weight of the load on the scale.

The operation of the apparatus of this invention has been described in connection with the description of details of the mechanism up to the point when the carriage 58 commences its traverse toward the right, as viewed in Figure 3. Let it be assumed for the purpose of illustration that the load on the scale weighs one hundred and fifty-five pounds. The indicia or numeral one hundred fifty-five is thus brought in register with the hairline 45, as shown in Figure 4. Also in register with the hairline is the graduation of the scale. The graduation 43 and numerical indication 44 are, of course, light transmitting and since the light ray from the lamp passes through them, they are thrown on the screen. The switch 136' is then manually closed, closing the circuit through motor 82 and scanning device 60-65 then commences its travel across the chart in a horizontal line including the hairline, as will be understood, in this instance, along the line 173 of Figure 8. At this time also the light transmitting areas 145, 155 and 161 also intercept the horizontal line 173 including the hairline. Thus, as the light ray from light source 60 travels along the line 173, it passes over opaque areas of the chart 41 until it reaches the light transmitting area 145 which is the fifth area in the staggered areas shown in Figure 9. The light ray is able to pass through this area 145 and fall upon the light responsive circuit closing device 64 to energize a relay 182, for instance, and complete circuits 183 (Figure 10) by which printing or other mechanism is actuated to record or print the numeral 5. In the illustrated embodiment, an amplifying device 186 of any suitable kind is included in the circuit comprising the light responsive switching device 64 and the relay 182. The light ray from lamp 60 then passes on (due to the continuation of the movement of the carriage 58) across the opaque surface of the chart until it reaches the light transmitting area 155. It will be understood that the area 155, for instance, is of a dimension circumferentially to be traversed by the light ray in its travel along any of the paths intercepting any one of the areas 141-149 because each one of these units 1-9 is in the "fifty" range, in this instance fifty-five, of the weight indication one fifty-five. Again, the light responsive circuit closing device 64 is energized to complete the circuits as before to initiate, say, the printing operation. The light ray then continues its travel along the horizontal path 173 until it intercepts the light transmitting area 161 which is a hundreds graduation and represents, in the illustration here given, the one hundreds area. Again, the light ray passes through the area 161 to fall on the light responsive device 64 to again initiate a further operation. It is to be noted that the hundred area 161 extends in a circumferential direction a distance sufficient to be crossed by the light ray in its path through any one of the nine "tens" areas 151 to 159 as well as any one area of the nine series of areas 141-149. Obviously where no weight is recorded in the units or tens columns as, for instance, where the load on the scale weighed one hundred pounds, the light ray passes between the light transmitting areas 141 to 149 and 151 to 159, i. e., on relatively opaque areas of the chart during this portion of its movement until it falls upon the light transmitting area 161.

The carriage 58 having completed its stroke corresponding to dead center position of the crank 75, a cam member 246 on carriage 58 first opens leaf spring contacts 253 thereby deenergizing the circuits 183 of the printing mechanism and then commences its return movement. At, or just prior to, its return to initial position, the lug 102 on the crank disk 78 strikes the rod 105 raising the tooth 106 out of the recess 108 and thereby moving the lower end of the rod 105 with sufficient force to cause it to move back to its initial position through the instrumentality of the force of the spring 101 and the coacting cam surfaces 103 and 104. This rotating movement also permits the release of the cooperating clutch members so that the worm wheel 87, which carries the clutch member coacting with the clutch member 86, is free to rotate with respect to the shaft 80 and the shaft 80 and its associated parts are not affected by the further rotation of the motor 82 in coming to a stop, the respective cam surfaces 103, 104 riding easily over one another. Movement of the arm 100 carries the collar 97 about the shaft 80 and causes the lever 92 to rock to cause the engagement of the knife edge 91 with one of the grooves 90 in the collar 89. This occurs substantially instantaneously so that the crank disc 78 is stopped in its movement promptly. Movement of the arm 92 into braking position with respect to the drum 89 moves the end 91 away from the spring contacts 138, permitting these contacts to open and to interrupt the circuit through the motor 82 whereby the motor 82 is deenergized. Interrupting the circuits through the contacts 138 also interrupts the circuit preparatory to the next cycle of movement of the work performing member 72. Also the return of the lever 72 returns the printing mechanism to original position coincident with the return of the carriage 58 to its original position.

Figure 11:
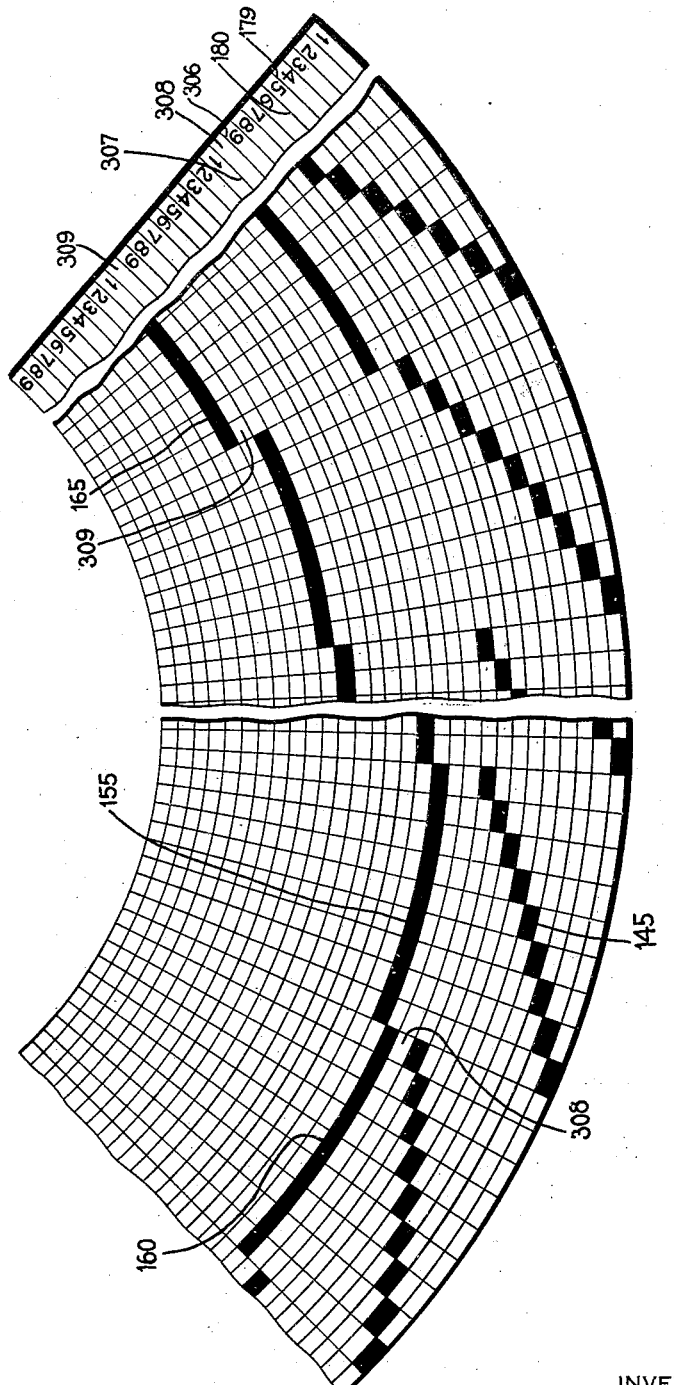
Figure 11 shows a modified chart of this invention.

In some situations it may be desirable to provide an appreciable interval of time in the movement of the light responsive device between the time that the light ray travels across that area of the chart occupied by the patterns designed to complete a circuit through instrumentalities effecting the printing of a figure in the units column and the time when the light responsive device travels across that area of the chart occupied by the pattern controlling the printing of figures in the tens column. It will be appreciated that, whether the printing is done mechanically or by electrically actuated instrumentalities, the devices which effect the printing of the units must be deenergized or rendered inoperative after the printing operation is completed and then the instrumentalities effecting the printing in the tens column must be energized or rendered operative in order to print the figure in the tens column. The same holds true as respects the time element between the instrumentalities of the tens column and the instrumentalities effecting the printing in the hundreds column and so on. A further consideration is the desirability of providing for a delay in the actuation of the photoelectric circuit closing device or its equivalent to allow for incorrect timing of the various operations due to mechanical wear of the parts. In Figure 11, a chart is illustrated, the respective areas of which are determined in the same way as that described in connection with Figures 8 and 9 and like reference characters are affixed to corresponding areas. Assume, therefore, that the area 145 in Figure 11 corresponds to the area 145 in Figure 8 and will affect the photo-electric cell to cause it to close the circuit. This element is defined as before by imaginary radial lines coinciding with corresponding edges of successive scale graduations representing the fifth unit of weight between the one hundred fiftieth and one hundred sixtieth graduation 43 on the scale. In other words, this area 145 subtends the angle which is subtended by the subdivision on the scale with which the pointer will coincide when a load of one hundred fifty-five pounds is on the scale. Similarly the area 155 is defined by the imaginary radial lines coinciding with corresponding edges of the one hundred fiftieth and one hundred sixtieth graduation on the scale. In other words, the area 155 subtends the angle which is subtended by that subdivision on the scale over which the pointer will travel as the load on the scale changes from one hundred fifty pounds to one hundred fifty-nine pounds inclusive.

Similarly, the area 165, only a fragment of which is shown in Figure 11, is defined by radial lines passing through corresponding edges of the one hundredth and two hundredth graduations on the scale 43 and subtends the same angle as that over which the pointer travels in recording a load on the scale between one hundred pounds and one hundred ninety-nine pounds.

As before, the unit areas are arranged in echelon between successive arcs at varying distances from the center. The nine areas, of which the area 145 is the middle area, lie between the arcs such as indicated for area 145 at 179, 180, fragments of which are shown at the right hand end of Figure 11, and between which arcs are numerals from one to nine representing the nine unit areas. As before, the area 145 lies between the arcs 179 and 180. A second group of spaces defined by arcs is also illustrated for the nine tens area of which the area 155 is the fifth area and lies between the arcs between which the numeral 5 of the second group appears. It will be noted that the space between the arcs 306 and 307 is not numbered, the ninth space being on the outside of the arc 306 and the first space of the tens group on the other side of this space. The reference character 308 is given to this unoccupied space. It will be noted that this arcuate space 308 contains no weight representing area and the gap between corresponding areas is also given the same reference character 308 throughout the figure. It will be apparent, therefore, that as the light ray passes from the light transmitting area, to which the reference character 149 is affixed, to the light transmitting area 154, it crosses the opaque area 308, thus affording ample time for the deenergization of the instrumentalities which would effect printing of the numeral 9 before the instrumentalities effecting the printing of the numeral 4 in the tens column are energized as a result of the light ray passing through the light transmitting area 154. Similarly, the unnumbered area between the tens arcuate spaces and the hundreds arcuate spaces is given the reference character 309 and the same area has the reference character 309 affixed to it between the end of area 159 and 160, as will be understood.

It will thus be seen that we have provided an automatic weighing scale in which we are enabled to effect the accurate automatic registering and printing of a ticket thereby recording the loads placed upon a weighing machine and in which means, mechanically separate from any part of the weighing mechanism, but controlled by the latter, control the registering, ticket printing and/or recording means.

Various modifications will occur to those skilled in the art in the composition, configuration and weight representing areas of the chart of this invention as well as in the areas which are opaque as compared with those which are light transmitting and furthermore as well as in the manner in which its movements are correlated with the scale beam. Furthermore, various modifications will occur to those skilled in the art in the instrumentalities selected for traversing the light responsive means with respect to the chart and in the motor means therefor as well as in the work effected thereby. No limitation is intended by the phraseology of the foregoing description or illustrations in the accompanying drawings, except as indicated in the appended claims.

What is claimed is:

1. In a weighing scale having a beam, the combination with a shaft, the angular rotation of which is proportional to the displacement of the scale beam, of a chart movable proportionally to the movement of the shaft, said chart being formed with relatively substantially light transmitting areas and substantially opaque areas arranged in predetermined relation corresponding to loads on the scale, a carriage, rods to guide said carriage in a fixed path across the face of the chart, light responsive circuit closing means and a light source movable with the carriage and disposed respectively in paths of movement upon opposite sides of said chart, a work performing member, a drive shaft, operative connections between the drive shaft and the carriage and the work performing member, a motor, operative connections between the motor and the drive shaft, a motor switch, and restraining means for the drive shaft closing the motor switch when the restraining means is disengaged.

2. In a weighing scale having a beam, a chart movable proportionally to the movement of the scale beam, said chart being formed with relatively substantially light transmitting areas and substantially opaque areas arranged in predetermined relation corresponding to loads on the scale, a pair of spaced parallel rods bearing a fixed relation to the chart, a carriage movable on the rods, a light responsive switch means carried with the carriage on one side of the plane of movement of the carriage with respect to the rods, a light source carried with the carriage on the opposite side of the chart from the light responsive switch means to direct a light ray on the chart and light responsive switch means, an electric motor, a shaft, friction means adapted to connect and disconnect the motor to the shaft, a work performing member, a crank disc fixed on the shaft to turn therewith, means linking the carriage and the crank disc and the work performing member to move synchronously, electric circuit means including the light responsive switch means, an electric circuit including the motor and a motor circuit closer, and a locking device for the shaft movable between an operative and an inoperative position and actuating the circuit closer in inoperative position of the locking device.

3. In a weighing scale having a beam, a chart movable proportionally to the movement of the beam, said chart being formed with relatively substantially light transmitting areas and substantially opaque areas arranged in predetermined relation corresponding to loads on the scale, light responsive switch means and a light source movable in paths of movement upon opposite sides of said chart, an electric motor, a drive shaft, friction disc means adapted to connect and disconnect the motor to the drive shaft, a work performing member, a crank disc on the drive shaft, means linking the light-responsive switch means and the crank disc and the work performing member to move synchronously, electric circuit means including the light responsive switch means, an electric circuit including the motor and a motor switch, a locking lever, interengaging means between the drive shaft and the locking lever, said locking lever actuating the motor switch when said locking lever is disengaged from said shaft, a rockable member operatively connected with the lever whereby said member is rocked, means connecting the rockable member and the motor, a spring pressed plunger, guide means for the plunger, coacting means between the plunger and the guide means, and means movable with the crank disc to render said plunger inoperative with respect to the coacting means.

4. In a weighing scale having a scale beam, a chart, the movement of which is proportional to the displacement of the scale beam, said chart being formed with relatively substantially light transmitting areas and substantially opaque areas arranged in predetermined relation corresponding to loads on the scale, a carriage movable in fixed relation to the chart to scan said chart, a light responsive switch means carried with the carriage on one side of the chart, a light source and lens system carried with the carriage on the opposite side of the chart from the light responsive switch means to direct a light ray on the chart and light responsive switch means, an electric motor, a drive shaft, locking lever means adapted to connect and disconnect the motor to the shaft, a movable member adapted to perform work, a crank disc having a lug and mounted on the drive shaft, means linking the carriage and the crank disc with the movable member to move synchronously, an electromagnet, electric circuit means including the light responsive switch means, a manually actuated motor switch and the electromagnet; an electric circuit including the motor and the motor switch, a locking lever, interengaging means between the drive shaft and the locking lever means, said locking lever means actuating the motor switch when said shaft is disengaged from the lever, a rockable member operatively connected with the lever, a plunger, a spring to press the plunger to engage with the lug on the crank disc, fixed guide means formed with a slot and a lug on the plunger to be received in the slot to retain the plunger in one position of movement, and means connecting the rockable member and the electromagnet to move the rockable member at the commencement of a scanning movement.

5. In a weighing scale having a beam, a shaft movable proportionally to the movement of the beam, a chart carried by the shaft and formed with relatively substantially light transmitting areas and substantially opaque areas arranged in predetermined relation corresponding to loads on the scale, light responsive switch means and a light source movable in paths of movement upon opposite sides of said chart, means to move the light responsive switch means, control means therefor, brake vane means carried by the shaft, at least one reciprocable brake shoe adapted to engage the brake vane means at one position of its reciprocation, means to advance the reciprocable brake shoe toward the brake vane means to cause the brake shoe to engage the brake vane means, and means operatively connecting the control means and the brake shoe.

6. In a scale having a beam, the combination with a shaft the angular rotation of which is proportional to the displacement of the scale beam, of a chart movable proportionally to the movement of the shaft, said chart being formed with relatively substantially light transmitting areas and substantially opaque areas arranged in predetermined relation corresponding to loads on the scale, carriage means having a fixed path of movement with respect to the chart, light responsive means and a light source carried by the carriage and disposed, respectively, in paths of movement upon opposite sides of said chart, a drive shaft, a crank disc carried thereby, operative connections between the crank disc and the carriage, a collar rotatable on the last-named shaft, a U-shaped arm, one leg of which is carried by the collar, a spring pressed plunger carried with the arm in the plane of the crank disc, latching means engaging the plunger in one position of its movement, means actuated by the collar to control movement of the last-named shaft, and means carried with the crank disc to release the plunger.

7. In a scale having a beam, the combination with a shaft, the angular rotation of which is proportional to the displacement of the scale beam, of a chart movable proportionally to the movement of the shaft, said chart being formed with relatively substantially light transmitting areas and substantially opaque areas arranged in predetermined relation corresponding to loads on the scale, a carriage, rods to guide said carriage in a fixed path across the face of the chart, light responsive switch means and a light source carried with the carriage and disposed respectively in paths of movement upon opposite sides of said chart whereby a ray of light from the light source may pass through light transmitting areas of the chart, a drive shaft, operative connections between the drive shaft and the carriage, lever means adapted to perform work, operative connections between the lever means to perform work and the carriage, a motor, a switch controlling the motor, clutch means between the shaft and the motor, said clutch means actuating the switch, and means to actuate the clutch.

LEWIS C. BARNES.
RAYMOND B. HOLT.